(12) United States Patent
Sugata et al.

(10) Patent No.: US 12,399,303 B2
(45) Date of Patent: Aug. 26, 2025

(54) LAMINATE, METHOD OF PRODUCING LAMINATE, METHOD OF FORMING OPTICAL BODY, AND CAMERA MODULE-EQUIPPED DEVICE

(71) Applicant: Dexerials Corporation, Tokyo (JP)

(72) Inventors: Hiroshi Sugata, Tokyo (JP); Hiroshi Tazawa, Tokyo (JP); Shunichi Kajiya, Tokyo (JP)

(73) Assignee: Dexerials Corporation, Tokyo (JP)

( * ) Notice: Subject to any disclaimer, the term of this patent is extended or adjusted under 35 U.S.C. 154(b) by 1002 days.

(21) Appl. No.: 17/288,124

(22) PCT Filed: Oct. 30, 2019

(86) PCT No.: PCT/JP2019/042601
§ 371 (c)(1),
(2) Date: Apr. 23, 2021

(87) PCT Pub. No.: WO2020/095792
PCT Pub. Date: May 14, 2020

(65) Prior Publication Data
US 2021/0382205 A1    Dec. 9, 2021

(30) Foreign Application Priority Data

Nov. 8, 2018 (JP) ................................. 2018-210852

(51) Int. Cl.
| | | |
|---|---|---|
| B32B 3/30 | (2006.01) | |
| B29D 11/00 | (2006.01) | |
| B32B 7/022 | (2019.01) | |
| B32B 7/06 | (2019.01) | |
| B32B 7/12 | (2006.01) | |
| B32B 27/16 | (2006.01) | |
| B32B 27/36 | (2006.01) | |
| G02B 1/118 | (2015.01) | |

(52) U.S. Cl.
CPC .......... *G02B 1/118* (2013.01); *B29D 11/0073* (2013.01); *B32B 3/30* (2013.01); *B32B 7/022* (2019.01); *B32B 7/06* (2013.01); *B32B 7/12* (2013.01); *B32B 27/16* (2013.01); *B32B 27/36* (2013.01); *B32B 2307/732* (2013.01); *B32B 2551/00* (2013.01)

(58) Field of Classification Search
None
See application file for complete search history.

(56) References Cited

U.S. PATENT DOCUMENTS

| | | | | |
|---|---|---|---|---|
| 2011/0123777 A1* | 5/2011 | Imaoku | .................. | G02B 1/118 |
| | | | | 252/582 |
| 2017/0222182 A1* | 8/2017 | Mo | .......................... | B32B 7/12 |
| 2017/0293051 A1* | 10/2017 | Kawasaki | ................ | G02B 1/14 |
| 2017/0348943 A1* | 12/2017 | Kajiya | ............. | B29D 11/00788 |
| 2018/0100957 A1* | 4/2018 | Ye | .......................... | H04N 25/63 |

FOREIGN PATENT DOCUMENTS

| | | |
|---|---|---|
| EP | 3031602 A1 | 6/2016 |
| JP | 2004151633 A | 5/2004 |
| JP | 2007009133 A | 1/2007 |
| JP | 2011221131 A | 11/2011 |
| JP | 2012242803 A | 12/2012 |
| JP | 2013134276 A | 7/2013 |
| JP | 2016122163 A | 7/2016 |
| JP | 2016210150 A | 12/2016 |
| JP | 2017149948 A | 8/2017 |
| KR | 1020170100507 A | 9/2017 |
| WO | 2014065136 A1 | 5/2014 |

OTHER PUBLICATIONS

Jul. 12, 2022, Office Action issued by the China National Intellectual Property Administration in the corresponding Chinese Patent Application No. 201980073466.5.
May 11, 2021, International Preliminary Report on Patentability issued in the International Patent Application No. PCT/JP2019/042601.
Feb. 16, 2023, Office Action issued by the Korean Intellectual Property Office in the corresponding Korean Patent Application No. 10-2021-7013487.
Dec. 10, 2019, International Search Report issued in the International Patent Application No. PCT/JP2019/042601.
Jul. 5, 2022, the Extended European Search Report issued by the European Patent Office in the corresponding European Patent Application No. 19881608.4.
May 30, 2022, Office Action issued by the Korean Intellectual Property Office in the corresponding Korean Patent Application No. 10-2021-7013487.

* cited by examiner

*Primary Examiner* — Sheeba Ahmed
(74) *Attorney, Agent, or Firm* — KENJA IP LAW PC

(57) ABSTRACT

A laminate includes a thin film structural body and retention films. A first retention film is stacked on one face of the thin film structural body and a second retention film is stacked on another face of the thin film structural body. The thin film structural body has a first fine irregularity structure at a face that is in contact with the first retention film and has a second fine irregularity structure at a face that is in contact with the second retention film. The first retention film has a third fine irregularity structure at a face that is in contact with the thin film structural body. The second retention film has a fourth fine irregularity structure at a face that is in contact with the thin film structural body. The laminate includes a half cut section. The second retention film contains a UV-curable resin.

11 Claims, 10 Drawing Sheets

LAMINATE, METHOD OF PRODUCING LAMINATE, METHOD OF FORMING OPTICAL BODY, AND CAMERA MODULE-EQUIPPED DEVICE

TECHNICAL FIELD

The present disclosure relates to a laminate, a method of producing a laminate, a method of forming an optical body, and a camera module-equipped device.

BACKGROUND

In display devices such as liquid-crystal displays and optical devices such as cameras, an incident surface of light of a substrate such as a display panel or a lens is often subjected to anti-reflection treatment in order to avoid deterioration of visibility and image quality (occurrence of color irregularities, ghosts, etc.) caused by reflection of extraneous light. This anti-reflection treatment may be performed by a conventionally known method in which a fine irregularity structure is formed at the incident surface of light so as to reduce reflectance.

Formation of a fine irregularity structure at the incident surface of light can be achieved by, for example, affixing a film having a fine irregularity structure at a surface thereof to the incident surface. This method is highly advantageous from viewpoints such as that processing of the substrate itself is not necessary, that the film itself can be distributed to market (i.e., is portable), and that a fine irregularity structure can be formed in a partial manner in a target region at the surface of the substrate.

In a situation in which a film having anti-reflection function is itself to be distributed, performing half cut processing of a film in which peelable films are stacked makes it is easy to peel off a required part when the film having anti-reflection function is to be bonded to an object serving as an adherend.

For example, Patent Literature (PTL) 1 discloses a pressure-sensitive adhesive film for half cut processing that includes a substrate layer and a pressure-sensitive adhesive layer. In another example, PTL 2 discloses half cutting a functional optical film that is stacked on a conductive metal layer. In the invention disclosed in PTL 2, the functional optical film is affixed to the conductive metal layer via an adhesive.

CITATION LIST

Patent Literature

PTL 1: JP 2017-149948 A
PTL 2: JP 2004-151633 A

SUMMARY

Technical Problem

The film disclosed in PTL 1 is affixed through a pressure-sensitive adhesive layer, and the film disclosed in PTL 2 is affixed through an adhesive. A film that is affixed via a pressure-sensitive adhesive layer, an adhesive, or the like faces issues such as environment testing durability being low and waviness readily occurring.

The present disclosure is directed to solving the various problems in the conventional art set forth above and achieving the following objects. Specifically, one object of the present disclosure is to provide a laminate that enables simple peeling of a thin film structural body having a fine irregularity structure at a surface thereof when the thin film structural body is to be bonded to an object serving as an adherend, that has improved environment testing durability, and in which waviness is inhibited. Another object of the present disclosure is to provide a method of producing this laminate. Another object of the present disclosure is to provide a method of forming an optical body having excellent anti-reflection performance on a base plate using this laminate. Another object of the present disclosure is to provide a camera module-equipped device that can acquire a captured image in which color irregularities, ghosts, and the like are inhibited.

Solution to Problem

The following are provided as a solution to the problems set forth above.

<1> A laminate comprising a thin film structural body and retention films, wherein
a first retention film is stacked on one face of the thin film structural body and a second retention film is stacked on another face of the thin film structural body,
the thin film structural body has a first fine irregularity structure at a face that is in contact with the first retention film and has a second fine irregularity structure at a face that is in contact with the second retention film,
the first retention film has a third fine irregularity structure at a face that is in contact with the thin film structural body,
the second retention film has a fourth fine irregularity structure at a face that is in contact with the thin film structural body,
the laminate includes a half cut section in a thickness direction, and
the second retention film contains a UV-curable resin, and the UV-curable resin has a storage modulus at 25° C. of 1.1 GPa or less.

<2> The laminate according to <1>, wherein a base substrate of the first retention film has a thickness of 100 μm or less.

<3> The laminate according to <1> or <2>, wherein P1>P2 is satisfied when peeling force at an interface of the first retention film and the thin film structural body in a 90° peeling test in accordance with JIS Z0237:2009 is taken to be P1 (N/25 mm) and peeling force at an interface of the second retention film and the thin film structural body in a 90° peeling test in accordance with JIS Z0237:2009 is taken to be P2 (N/25 mm).

<4> The laminate according to any one of <1> to <3>, wherein the half cut section has a circular shape or a polygonal shape in a top view of the laminate.

<5> The laminate according to any one of <1> to <4>, wherein the thin film structural body has a thickness of 5 μm or less.

<6> The laminate according to any one of <1> to <5>, wherein the first retention film contains a UV-curable resin.

<7> The laminate according to any one of <1> to <6>, wherein the third fine irregularity structure is an inverted structure of the first fine irregularity structure and the fourth fine irregularity structure is an inverted structure of the second fine irregularity structure.

<8> The laminate according to any one of <1> to <7>, wherein the first fine irregularity structure, the second fine irregularity structure, the third fine irregularity structure, and the fourth fine irregularity structure are each formed of an irregularity pattern having a pitch equal to or less than a wavelength of visible light.

<9> A method of producing a laminate comprising a step of, in formation of the half cut section in the laminate according to any one of <1> to <8>, forming the half cut section with the laminate in a pressed state.

<10> A method of forming an optical body on a base plate comprising peeling the first retention film and the second retention film from the laminate according to any one of <1> to <8> and stacking the thin film structural body on a base plate via an adhesive.

<11> The method of forming an optical body on a base plate according to <10> comprising:

a first peeling step of peeling a single-side peeled laminate formed of the thin film structural body and the first retention film from the second retention film, inside of the half cut section, to obtain the single-side peeled laminate;

an application step of applying the adhesive onto the base plate;

a pressing step of pressing the single-side peeled laminate against the adhesive that has been applied such that a face where the second retention film has been peeled off faces toward the base plate;

a curing step of irradiating the adhesive that has been pressed with UV light to cure the adhesive; and a second peeling step of releasing pressing of the single-side peeled laminate and peeling the thin film structural body from the single-side peeled laminate to form an optical body formed of the adhesive that has been cured and the thin film structural body on the base plate.

<12> A camera module-equipped device comprising a camera module and a display panel, wherein the display panel includes an adhesive layer stacked on at least part of a surface thereof and a thin film structural body stacked on the adhesive layer, the camera module is arranged such that the camera module and the thin film structural body face each other, and the thin film structural body is a thin film structural body obtained by peeling the first retention film and the second retention film from the laminate according to any one of <1> to <8>.

Advantageous Effect

According to the present disclosure, it is possible to provide a laminate that enables simple peeling of a thin film structural body having a fine irregularity structure at a surface thereof when the thin film structural body is to be bonded to an object serving as an adherend, that has improved environment testing durability, and in which waviness is inhibited. Moreover, according to the present disclosure, it is possible to provide a method of producing this laminate. Furthermore, according to the present disclosure, it is possible to provide a method of forming an optical body having excellent anti-reflection performance on a base plate using this laminate. Also, according to the present disclosure, it is possible to provide a camera module-equipped device that can acquire a captured image in which color irregularities, ghosts, and the like are inhibited.

DETAILED DESCRIPTION

The following provides a detailed description of the present disclosure based on embodiments.

(Laminate)

A presently disclosed laminate includes a thin film structural body and retention films. The thin film structural body has a first retention film stacked on one face of the thin film structural body and has a second retention film stacked on another face of the thin film structural body. The thin film structural body has a first fine irregularity structure at a face that is in contact with the first retention film and has a second fine irregularity structure at a face that is in contact with the second retention film. The first retention film has a third fine irregularity structure at a face that is in contact with the thin film structural body and the second retention film has a fourth fine irregularity structure at a face that is in contact with the thin film structural body. The laminate includes a half cut section in a thickness direction. The second retention film contains a UV-curable resin, and this UV-curable resin has a storage modulus at 25° C. of 1.1 GPa or less.

The presently disclosed laminate serves as an intermediate product used in formation of an optical body on a base plate (described further below).

The following describes a laminate according to one embodiment of the present disclosure (hereinafter, also referred to as the "laminate of the present embodiment") with reference to FIG. 1, etc.

Figure 1:
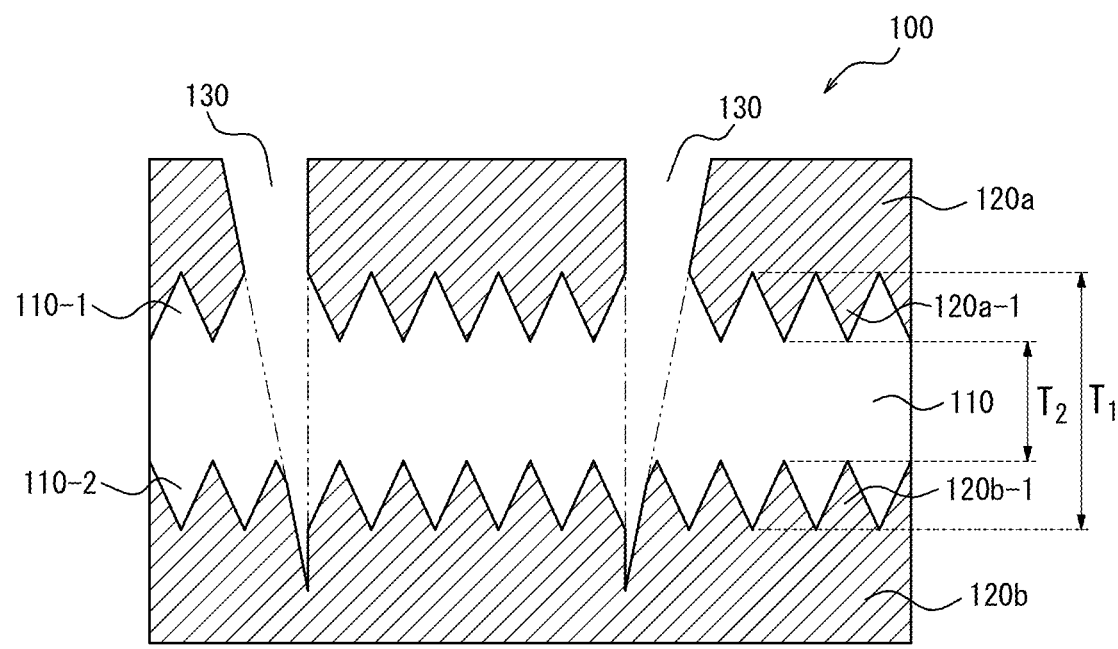
FIG. 1 is a schematic cross-sectional view illustrating a laminate according to one embodiment of the present disclosure.

As illustrated in FIG. 1, the laminate 100 of the present embodiment includes a thin film structural body 110 and two retention films (i.e., a first retention film 120a and a second retention film 120b). The first retention film 120a is stacked on one face of the thin film structural body 110 and the second retention film 120b is stacked on another face of the thin film structural body 110. In other words, the thin film structural body 110 is sandwiched between the two retention films. The thin film structural body 110 has a first fine irregularity structure 110-1 at a surface where the first retention film 120a is stacked and has a second fine irregularity structure 110-2 at a surface where the second retention film 120b is stacked. Moreover, the first retention film 120a has a third fine irregularity structure 120a-1 and the second retention film 120b has a fourth fine irregularity structure 120b-1.

The laminate 100 of the present embodiment also includes a half cut section 130 in a thickness direction. The "thickness direction" is the direction of stacking of the first retention film 120a, the thin film structural body 110, and the second retention film 120b. The half cut section 130 is a cut line that is formed in order to make it easier for a single-side peeled laminate formed of the thin film structural body 110 and the first retention film 120a to be peeled from the second retention film 120b. The half cut section 130 completely severs the first retention film 120a and the thin film structural body 110 and severs up to partway through the second retention film 120b as illustrated in FIG. 1.

Figure 2:
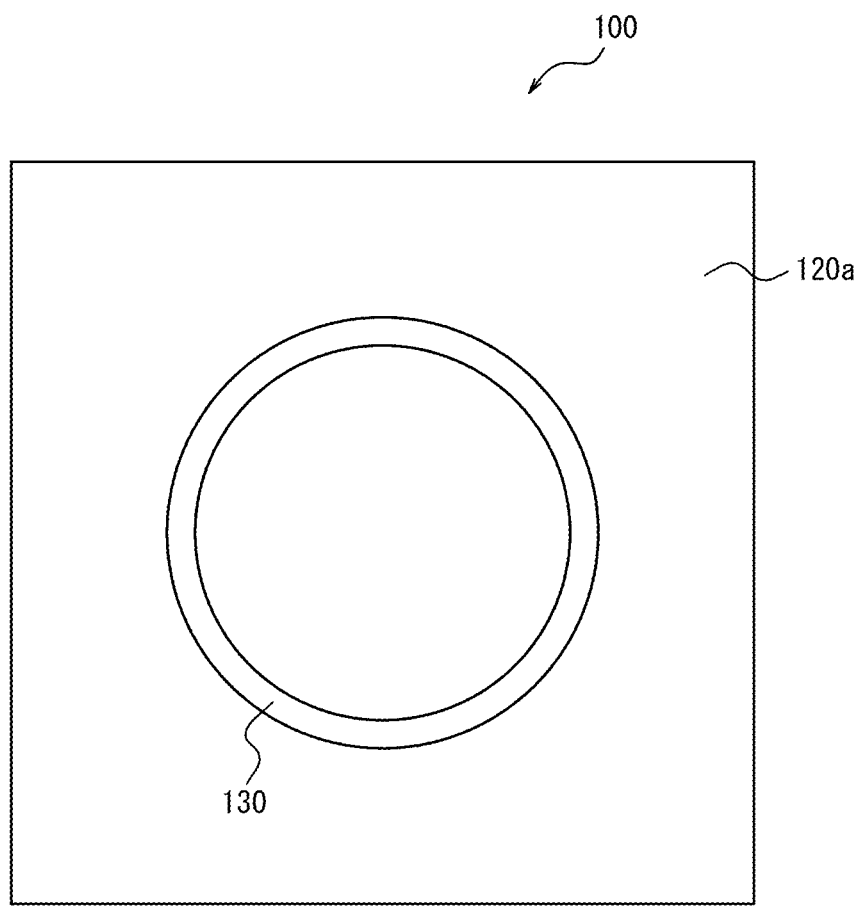
FIG. 2 is a top view illustrating a laminate according to one embodiment of the present disclosure.

FIG. 2 is a diagram of the laminate 100 as viewed from above. The half cut section 130 has a circular shape in a top view as illustrated in FIG. 2. It should be noted, however, that the shape of the half cut section 130 in a top view is not limited to a circular shape. For example, the half cut section 130 may have a polygonal shape such as a quadrangular shape in a top view.

The laminate of the present embodiment satisfies P1>P2 when peeling force at an interface of the first retention film 120a and the thin film structural body 110 in a 90° peeling test in accordance with JIS Z0237:2009 is taken to be P1 (N/25 mm) and peeling force at an interface of the second retention film 120b and the thin film structural body 110 in a 90° peeling test in accordance with JIS Z0237:2009 is taken to be P2 (N/25 mm).

As a result of the laminate 100 of the present embodiment including the half cut section 130 in the thickness direction as previously described, a single-side peeled laminate formed of the thin film structural body 110 and the first retention film 120a can easily be peeled from the second retention film 120b, inside of the half cut section 130, when the thin film structural body 110 is to be bonded to an object serving as an adherend.

Moreover, as a result of the thin film structural body 110 being sandwiched by the two retention films with faces having fine irregularity structures (third fine irregularity structure 120a-1 and fourth fine irregularity structure 120b-1) in contact therewith in the laminate 100 of the present embodiment as previously described, the thin film structural body 110 can closely adhere to the two retention films without a pressure-sensitive adhesive layer, an adhesive, or the like interposed therebetween. Through the thin film structural body 110 and the two retention films being closely adhered without a pressure-sensitive adhesive layer, an adhesive, or the like interposed therebetween in this manner in the laminate 100 of the present embodiment, the laminate 100 of the present embodiment has high environment testing durability and can inhibit the occurrence of waviness.

Moreover, as a result of there being a difference between one face and the other face of the thin film structural body 110 in terms of peeling force with the retention film stacked thereat as previously described, the laminate 100 of the present embodiment makes it possible to smoothly peel the retention film having low peeling force (second retention film 120b) from the thin film structural body 110 while maintaining a stacked state of the retention film having high peeling force (first retention film 120a) and the thin film structural body 110. Furthermore, damage to a fine irregularity structure is inhibited during peeling of a retention film, and particularly during peeling of the second retention film 120b. In contrast, when peeling of either of the two retention films is attempted in a case in which peeling force with a retention film is the same at both one face and the other face of the thin film structural body 110, splitting of the thin film structural body 110 may occur near the center thereof, the majority of a fine irregularity structure may be taken away to the retention film side, and it may not be possible to maintain sufficient quality until the thin film structural body 110 is actually used by a customer.

Note that peeling of the first retention film 120a can be performed smoothly by, after peeling off the second retention film 120b, bonding the thin film structural body 110 to a base plate or the like in advance.

In the laminate 100 of the present embodiment, the peeling force P1 at the interface of the first retention film 120a and the thin film structural body 110 and the peeling force P2 at the interface of the second retention film 120b and the thin film structural body 110 are each more than 0 N/25 mm, preferably 0.05 N/25 mm or more, and preferably 0.5 N/25 mm or less. When P1 and P2 are 0.05 N/25 mm or more, spontaneous peeling of the retention films due to external factors or the like can be inhibited. Moreover, when P1 and P2 are 0.5 N/25 mm or less, damage to a fine irregularity structure of the thin film structural body 110 can be more sufficiently inhibited during peeling of a retention film.

Note that in a case in which almost the entire surface of the thin film structural body 110 is taken away to the retention film side during measurement of the peeling force at an interface of a retention film and the thin film structural body 110, it is judged that peeling of the measurement subject was not possible and that "peel strength measurement value: more than 0 N/25 mm" is not even satisfied.

In the laminate 100 of the present embodiment, the difference (P1−P2) between the peeling force P1 at the interface of the first retention film 120a and the thin film structural body 110 and the peeling force P2 at the interface of the second retention film 120b and the thin film structural body is not specifically limited but is preferably 0.03 N/25 mm or more, and is preferably 0.3 N/25 mm or less. When P1−P2 is 0.03 N/25 mm or more, a retention film, and particularly the second retention film 120b, can be smoothly peeled from the thin film structural body 110 while also more effectively inhibiting damage to the thin film structural body 110 and a fine irregularity structure at the surface thereof. Moreover, when P1−P2 is 0.3 N/25 mm or less, it is possible to more effectively inhibit damage to the thin film structural body 110 and a fine irregularity structure at the surface thereof when the first retention film 120a is peeled from the thin film structural body.

Note that adjustment of the peeling force at an interface of a retention film and the thin film structural body 110 can be performed as appropriate through operations such as altering a constituent material of the thin film structural body 110, altering a fine irregularity structure of the thin film structural body 110, altering the thickness of a part of the thin film structural body 110 that is not a fine irregularity structure (described further below), adding an additive such as a fluorine-containing additive to a constituent material of a base substrate of the retention film (described further below), altering the thickness of the retention film, providing the retention film with an inorganic film, providing the retention film with a release film, and altering a constituent material or the thickness of the inorganic film or the release film. Accordingly, adjustment of P1–P2 can be performed as appropriate through any combination of the operations described above.

<Thin Film Structural Body>

The thin film structural body 110 used in the present embodiment has the first fine irregularity structure 110-1 and the second fine irregularity structure 110-2 at the faces thereof. In other words, fine irregularity patterns (protrusions that protrude in the thickness direction of the laminate and depressions that are depressed in the thickness direction of the laminate) are formed at both faces of the thin film structural body 110. The protrusions and depressions may be arranged periodically (for example, a staggered or rectangular grid), or may be arranged randomly. Moreover, the shape of the protrusions and the depressions is not specifically limited and may be a bullet shape, a pyramidal shape, a columnar shape, a needle shape, or the like. Note that the shape of a depression is the shape formed by an inner wall of the depression.

The thin film structural body 110 can be produced using a UV (ultraviolet) curable resin, for example. The UV-curable resin may be a UV-curable acrylic-based resin, a UV-curable epoxy-based resin, or the like, for example, without any specific limitations.

The average period (pitch) of irregularity patterns constituting the first fine irregularity structure 110-1 and the second fine irregularity structure 110-2 is preferably equal to or less than a wavelength of visible light (for example, 830 nm or less), more preferably 350 nm or less, and even more preferably 280 nm or less, and is more preferably 100 nm or more, and even more preferably 150 nm or more. By setting the pitch of an irregularity pattern at a surface of the thin film structural body 110 as equal to or less than a wavelength of visible light (i.e., by providing a structure referred to as a "moth-eye structure" at the surface of the thin film structural body 110), further improvement of anti-reflection performance can be achieved.

The depth of depressions (height of protrusions) of the irregularity patterns constituting the first fine irregularity structure 110-1 and the second fine irregularity structure 110-2 is not specifically limited but is preferably 150 nm or more, and more preferably 190 nm or more, and is preferably 300 nm or less, and more preferably 230 nm or less.

Note that the arrangement of depressions and protrusions, the average period of the irregularity pattern, the depth of depressions, and so forth may be the same or different for the first fine irregularity structure 110-1 and the second fine irregularity structure 110-2 of the thin film structural body 110.

The thickness of the thin film structural body 110 used in the present embodiment is preferably 10 µm or less, more preferably 5 µm or less, and even more preferably 1 µm or less, and is preferably 0.1 µm or more. Such a thin film structural body 110 can suitably be used in an application where both improvement of anti-reflection performance and reduction of thickness are required, such as in a notebook PC, tablet PC, smartphone, mobile phone, or the like that is equipped with an image sensor.

Note that the thickness of the thin film structural body 110 is the distance in the stacking direction or film thickness direction between the apex of a highest protrusion formed at one face and an apex of a highest protrusion formed at the other face as indicated by $T_1$ in FIG. 1.

The thickness of a part that is not a fine irregularity structure in the thin film structural body 110 used in the present embodiment is preferably 200 nm or less. When a laminate 100 including such a thin film structural body 110 is used in formation of an optical body by a subsequently described method of forming an optical body on a base plate according to one embodiment of the present disclosure, for example, the thin film structural body 110 can be more reliably peeled from a single-side peeled laminate after being bonded onto a base plate through an adhesive, and an optical body can be formed with high precision. On the other hand, the thickness of the part of the thin film structural body 110 that is not a fine irregularity structure can be set as 0.01 µm or more from a viewpoint of feasibility.

Note that the thickness of the part of the thin film structural body 110 that is not a fine irregularity structure is the distance in the stacking direction or film thickness direction between an apex of a deepest depression formed at one face and an apex of a deepest depression formed at the other face as indicated by $T_2$ in FIG. 1.

The thin film structural body 110 can be produced by, for example, preparing a base substrate and two fine irregularity layers as separate members and then forming the fine irregularity layers at both faces of the base substrate. However, it is preferable that the thin film structural body 110 is formed of a single member from a viewpoint of avoiding deterioration of optical properties. A laminate 100 that includes a thin film structural body 110 formed of a single member in this manner can be produced by the subsequently described method of producing a laminate 100, for example.

<Retention Films>

In the laminate 100 of the present embodiment, the two retention films (i.e., the first retention film 120a and the second retention film 120b) sandwich the thin film structural body 110. These two retention films are provided for protection of the thin film structural body 110, improvement of handleability, and so forth.

As illustrated in FIG. 1, the first retention film 120a has a third fine irregularity structure 120a-1 at a face that is in contact with the thin film structural body 110 and the second retention film 120b has a fourth fine irregularity structure 120b-1 at a face that is in contact with the thin film structural body 110. In other words, a fine irregularity pattern (protrusions that protrude in the thickness direction of the laminate 100 and depressions that are depressed in the thickness direction of the laminate 100) is formed at a specific face of the first retention film 120a and a specific face of the second retention film 120b. This makes it simple to form fine irregularity structures at both faces of the thin film structural body 110.

Moreover, as illustrated in FIG. 1, the third fine irregularity structure 120a-1 of the first retention film 120a is preferably an inverted structure of the first fine irregularity structure 110-1 of the thin film structural body 110, and the fourth fine irregularity structure 120b-1 of the second retention film 120b is preferably an inverted structure of the second fine irregularity structure 110-2 of the thin film structural body 110. This makes it possible for the thin film structural body 110 and the retention films 120a and 120b to be mechanically joined through the respective fine irregularity structures thereof and to strengthen protection of the fine irregularity structures formed at both faces of the thin film structural body 110, while also more effectively inhibiting damage to the thin film structural body 110 during peeling of a retention film. From the same viewpoints, it is more preferable that the fine irregularity structure of the first retention film 120a and the fine irregularity structure of the second retention film 120b interlock, without gaps, with the fine irregularity structures of the thin film structural body 110. Moreover, the thin film structural body 110 can closely adhere to the retention films 120a and 120b through frictional force due to mechanical joining through the fine irregularity structures of both the thin film structural body 110 and the retention films 120a and 120b. This effect of close adherence through frictional force due to interlocking of fine irregularity structures without gaps is referred to as an "anchor effect". Through this anchor effect, it is possible to maintain a closely adhered state of the thin film structural body 110 with the retention films 120a and 120b even without a pressure-sensitive adhesive, an adhesive, or the like interposed therebetween.

The average period (pitch) of the irregularity patterns constituting the third fine irregularity structure 120a-1 and the fourth fine irregularity structure 120b-1 is preferably equal to or less than a wavelength of visible light (for example, 830 nm or less), more preferably 350 nm or less, and even more preferably 280 nm or less, and is more preferably 100 nm or more, and even more preferably 150 nm or more in the same way as for the first fine irregularity structure 110-1 and the second fine irregularity structure 110-2.

Figure 3:
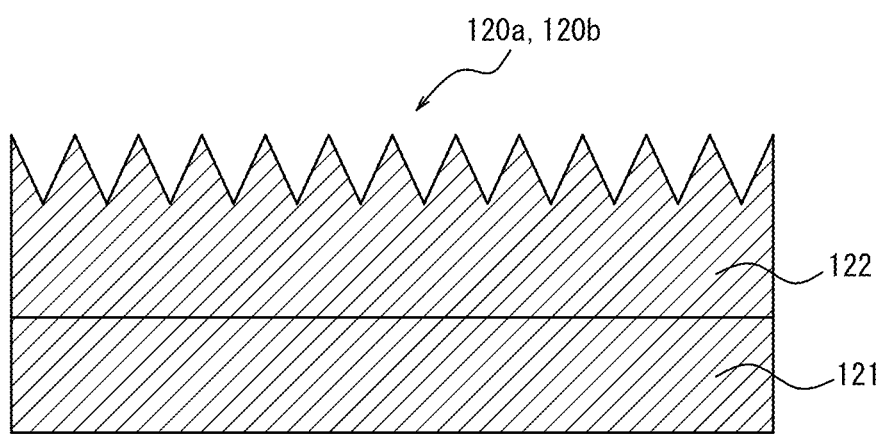
FIG. 3 is a schematic cross-sectional view illustrating a retention film of a laminate according to one embodiment of the present disclosure.

The retention films 120a and 120b can each be produced from a base substrate, for example. Moreover, the retention films 120a and 120b that each have a fine irregularity structure at a surface thereof can be produced as illustrated in FIG. 3, for example, by forming a fine irregularity layer 122 on a base substrate 121.

Although no specific limitations are placed on the material forming the base substrate 121, the material is preferably a material that is transparent and does not easily rupture, and may be PET (polyethylene terephthalate), TAC (triacetyl cellulose), or the like.

Formation of the fine irregularity layer 122 on the base substrate 121 can be achieved by, for example, implementing a method including a step of applying an uncured UV-curable resin onto one face of the base substrate 121, a step of bringing a roll on which a corresponding irregularity pattern has been formed into close contact with the applied UV-curable resin and transferring an irregularity pattern to the UV-curable resin, a step of irradiating the applied UV-curable resin with UV light to cure the UV-curable resin, and a step of peeling the UV-curable resin that has been cured from the roll. Note that the UV-curable resin may be a UV-curable acrylic-based resin, a UV-curable epoxy-based resin, or the like, for example, without any specific limitations. Moreover, various additives such as curing initiators may be added to the UV-curable resin as necessary.

<Production Method of Laminate>

The method by which the laminate 100 of the present embodiment is produced is not specifically limited and can be selected as appropriate depending on the objective. The following describes a specific example of a method for producing the laminate 100 with reference to FIGS. 4A to 4C.

The one example of a method includes a step of sandwiching a UV-curable resin between two retention films each having a fine irregularity structure at a surface thereof and performing pressure bonding thereof (sandwiching and pressure bonding step), a step of irradiating the UV-curable resin that has been sandwiched with UV light to cure the UV-curable resin (curing step), and a step of forming a half cut section 130 (half cut section forming step).

—Sandwiching and Pressure Bonding Step—

Figure 4A:
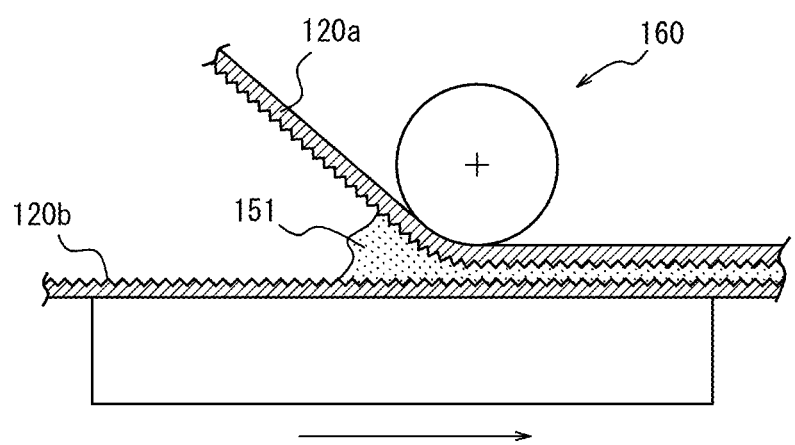
FIG. 4A is an overview illustrating one step in one example of a method for producing a laminate according to one embodiment of the present disclosure.

First, two retention films each having a fine irregularity structure at a surface thereof (first retention film 120a having third fine irregularity structure 120a-1 at surface and second retention film 120b having fourth fine irregularity structure 120b-1 at surface) are prepared. The first retention film 120a and the second retention film 120b are as previously described. Next, a UV-curable resin 151 is sandwiched between the above-described first retention film 120a and second retention film 120b such that the fine irregularity structures of the first retention film 120a and the second retention film 120b face each other as illustrated in FIG. 4A. Note that the UV-curable resin may be a UV-curable acrylic-based resin, a UV-curable epoxy-based resin, or the like, for example, without any specific limitations. Moreover, various additives such as curing initiators may be added to the UV-curable resin 151 as necessary. Furthermore, a monomer such as an ethylene oxide-based (EO-based) acrylic monomer, a propylene oxide-based (PO-based) acrylic monomer, or a fluorene-based monomer may be added to the UV-curable resin 151 from a viewpoint of increasing peelability and shape retainability.

The viscosity of the UV-curable resin 151 is preferably 30 cps or less. When the viscosity of the UV-curable resin 151 is 30 cps or less, it is possible to reduce the thickness of a part that is not a fine irregularity structure to 200 nm or less more easily in formation of the thin film structural body 110.

As illustrated in FIG. 4A, the sandwiched body is pressure bonded in a sandwiching direction through a pressure bonding device such as a roll laminator 160. By adjusting the pressure during pressure bonding in the sandwiching and pressure bonding step, it is possible to adjust the thickness of the obtained thin film structural body 110 ($T_1$ in FIG. 1) and the thickness of the part of the thin film structural body 110 that is not a fine irregularity structure ($T_2$ in FIG. 1). The thickness of the obtained thin film structural body 110 ($T_1$ in FIG. 1) and the thickness of the part of the thin film structural body 110 that is not a fine irregularity structure ($T_2$ in FIG. 1) can also be adjusted by adjusting the feed rate by the roll laminator.

It should be noted that although the second retention film 120b is positioned at a lower side and the first retention film 120a is positioned at an upper side relative to the roll laminator 160 in FIG. 4A, the positional relationship thereof is not specifically limited.

—Curing Step—

Figure 4B:
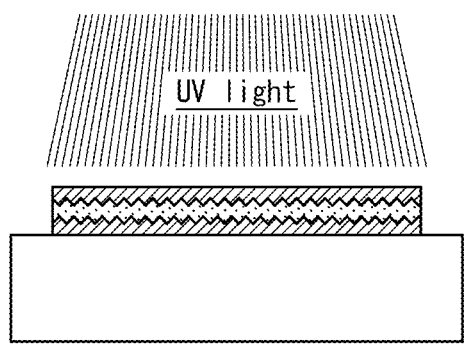
FIG. 4B is an overview illustrating one step in one example of a method for producing a laminate according to one embodiment of the present disclosure.

In the curing step, the UV-curable resin 151 that has been sandwiched is irradiated with UV light to cure the UV-curable resin 151 as illustrated in FIG. 4B. By curing the UV-curable resin 151, a thin film structural body 110 having fine irregularity structures at both faces, such as illustrated in FIG. 1, is formed as a single member, and a laminate 100 is obtained. Note that the curing step may be performed at the same timing as the sandwiching and pressure bonding step.

In the thin film structural body 110 that is obtained in this manner, a fine irregularity structure (first fine irregularity structure 110-1) that is interlocked, without gaps, with the third fine irregularity structure 120a-1 of the first retention film 120a is formed at one face of the thin film structural body 110, and a fine irregularity structure (second fine irregularity structure 110-2) that is interlocked, without gaps, with the fourth fine irregularity structure 120b-1 of the second retention film 120b is formed at the other face of the thin film structural body 110.

—Half Cut Section Forming Step—

Figure 4C:
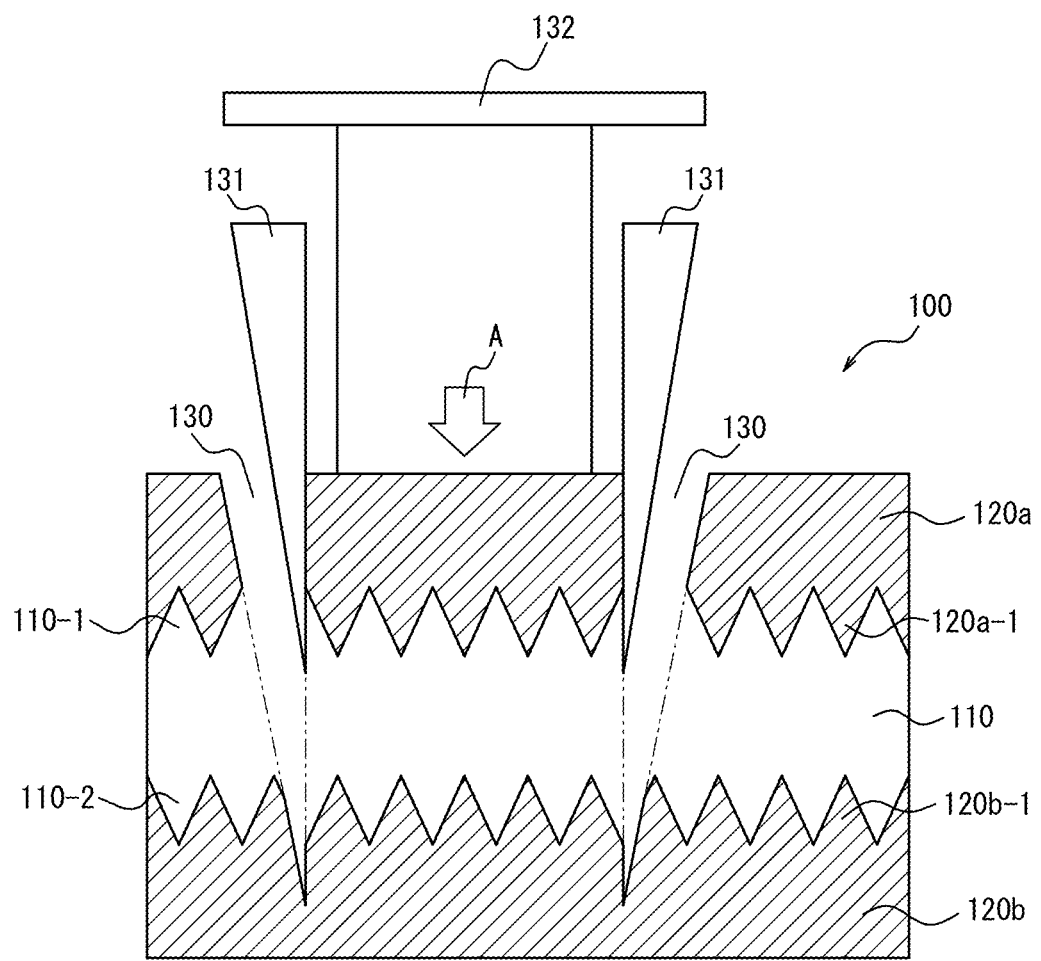
FIG. 4C is an overview illustrating one step in one example of a method for producing a laminate according to one embodiment of the present disclosure.

In the half cut section forming step, a half cut section 130 is formed by, in a state in which the laminate 100 is pressed in a direction of arrow A by an air cylinder 132, punching the periphery of the pressed part using a blade 131 as illustrated in FIG. 4C. The air cylinder 132 keeps the laminate 100 in a pressed state until the blade 131 has been withdrawn from the laminate 100. By pressing the laminate 100 using the air cylinder 132 in this manner, it is possible to prevent the first retention film 120a and the thin film structural body 110 being taken away by the blade 131 and the thin film structural body 110 being peeled from the second retention film 120b, inside of the half cut section 130, when the blade 131 is withdrawn.

When a half cut section is formed by laser cutting, for example, a lot of debris is formed, but since the half cut section 130 is formed through punching using the blade 131 in the half cut section forming step according to the present disclosure, the formation of debris during formation of the half cut section 130 can be inhibited.

Moreover, uprising of approximately 10% of film thickness at a severed part arises when a half cut section is formed by laser cutting, but by making the blade 131 a single-edged blade in the half cut section forming step according to the present disclosure, uprising of a severed part inside of the half cut section 130 can be reduced.

(Method of Forming Optical Body on Base Plate)

A presently disclosed method of forming an optical body on a base plate includes peeling the first retention film 120a and the second retention film 120b from the presently disclosed laminate 100 set forth above and stacking the thin film structural body 110 on a base plate via an adhesive. Through this method, it is possible for a thin film structural body 110 having fine irregularity structures at both faces to be formed, without damage, on a base plate as an optical body having excellent anti-reflection performance. In particular, through this method, it is possible to significantly inhibit damage to the fine irregularity structures during formation of the optical body even in a case in which the thin film structural body 110 is extremely thin (for example, 5 μm or less).

The following describes a method of forming an optical body on a base plate according to one embodiment of the present disclosure (hereinafter, also referred to as the "formation method of the present embodiment") with reference to FIGS. 5A to 5E.

FIGS. 5A to 5E are overviews illustrating the formation method of the present embodiment. The formation method of the present embodiment includes a first peeling step, an application step, a pressing step, a curing step, and a second peeling step.

Figure 5A:
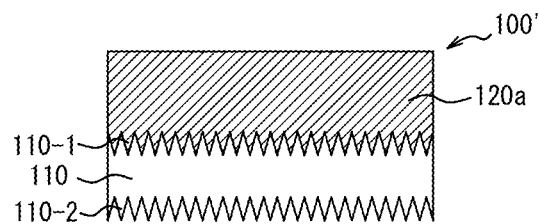
FIG. 5A is an overview illustrating one step in a method of forming an optical body on a base plate according to one embodiment of the present disclosure.

In the first peeling step, a single-side peeled laminate formed of the thin film structural body 110 and the first retention film 120a is peeled from the second retention film 120b illustrated in FIG. 1, inside of the half cut section 130, and is placed in a state (single-side peeled laminate 100') illustrated in FIG. 5A. As a result of P2 (peeling force at interface of second retention film 120b and thin film structural body 110) being smaller than P1 (peeling force at interface of first retention film 120a and thin film structural body 110), the single-side peeled laminate can be smoothly peeled from the second retention film 120b while also maintaining a stacked state of the first retention film 120a and the thin film structural body 110, and inhibiting damage to the second fine irregularity structure 110-2.

Figure 5B:
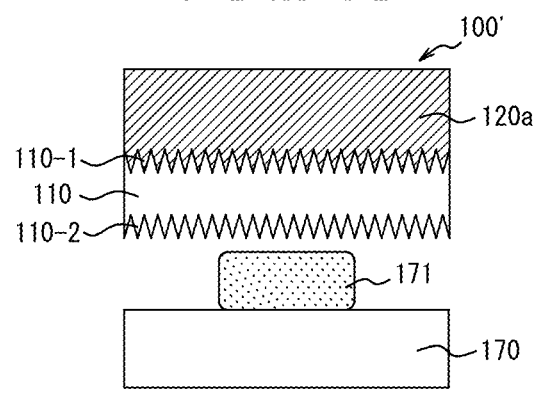
FIG. 5B is an overview illustrating one step in a method of forming an optical body on a base plate according to one embodiment of the present disclosure.

After the first peeling step, an adhesive 171 is applied onto a base plate 170 in the application step as illustrated in FIG. 5B. The adhesive 171 is not specifically limited and may, for example, be a composition containing a UV-curable resin such as a UV-curable acrylic-based resin or a UV-curable epoxy-based resin. The material forming the base plate 170 is not specifically limited and can be selected as appropriate depending on the objective of forming the optical body. For example, the material may be glass, glass that is surface coated with any organic material (for example, an epoxy acrylate copolymer), polymethyl methacrylate (PMMA), a cycloolefin copolymer (COC), a cycloolefin polymer (COP), or the like.

Figure 5C:
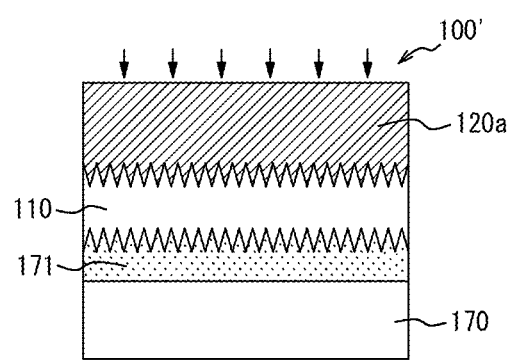
FIG. 5C is an overview illustrating one step in a method of forming an optical body on a base plate according to one embodiment of the present disclosure.

After the application step, the single-side peeled laminate 100' is pressed against the adhesive 171 that has been applied onto the base plate 170 such that the face where the second retention film 120b has been peeled off faces toward the base plate 170 in the pressing step as illustrated in FIG. 5C. The pressed adhesive 171 spreads out between the base plate 170 and the thin film structural body 110.

Figure 5D:
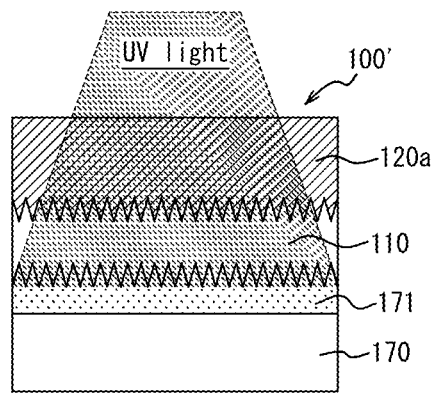
FIG. 5D is an overview illustrating one step in a method of forming an optical body on a base plate according to one embodiment of the present disclosure.

In the curing step illustrated in FIG. 5D, the pressed adhesive 171 is irradiated with UV light to cure the adhesive 171 while in a state in which pressing is maintained. The cured adhesive 171 strongly adheres to the base plate 170 and the thin film structural body 110.

Figure 5E:
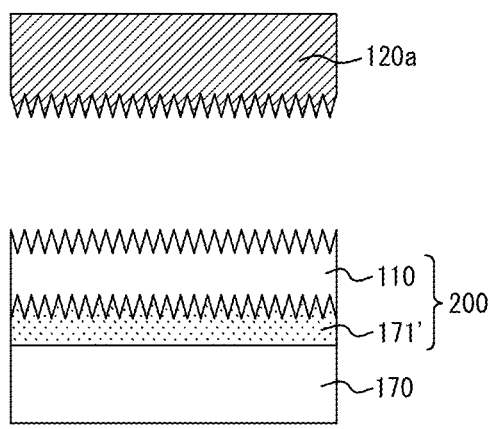
FIG. 5E is an overview illustrating one step in a method of forming an optical body on a base plate according to one embodiment of the present disclosure.

In the second peeling step illustrated in FIG. 5E, pressing of the single-side peeled laminate 100' is released in order to peel the first retention film 120a from the thin film structural body 110. Through the method set forth above, it is possible to form a thin film structural body 110 (or optical body 200) in a partial manner and with high precision with respect to a target region of a base plate surface. In particular, the method set forth above is advantageous in terms that a thin film structural body 110 (or optical body 200) can be formed in a partial manner and with high precision even with respect to a base plate to which adhesion is difficult (for example, a base plate formed of a polymer such as a cycloolefin copolymer (COC), a cycloolefin polymer (COP), or an epoxy acrylate copolymer).

In the optical body 200 that is formed on the base plate 170, the cured adhesive 171' can also enter depressions in a face at the base plate 170 side of the thin film structural body 110 as illustrated in FIG. 5E. In other words, the cured adhesive 171' can have a fine irregularity structure at a surface at the thin film structural body 110 side thereof. Such an optical body 200 has excellent anti-reflection performance and can, for example, have an average reflectance of 1% or less in a wavelength range of 400 nm to 750 nm.

(Camera Module-Equipped Device)

A presently disclosed camera module-equipped device includes a camera module and a display panel, wherein the display panel includes an adhesive layer stacked on at least part of a surface thereof and a thin film structural body stacked on the adhesive layer. The thin film structural body has fine irregularity structures at both faces thereof. In this camera module-equipped device, the camera module is arranged such that the camera module and the thin film structural body face each other. Through this camera module-equipped device, an image sensor of the camera module can capture a still image or a video via the thin film structural body having fine irregularity structures at both faces, and thus reflection of light can be suppressed, and color irregularities, ghosts, and the like in a captured image that is acquired can be inhibited.

The camera module-equipped device may, more specifically, be a notebook PC, a tablet PC, a smartphone, a mobile phone, or the like.

The following describes a camera module-equipped device according to one embodiment of the present disclosure (hereinafter, also referred to as the "device according to the present embodiment") with reference to FIG. 6.

Figure 6:
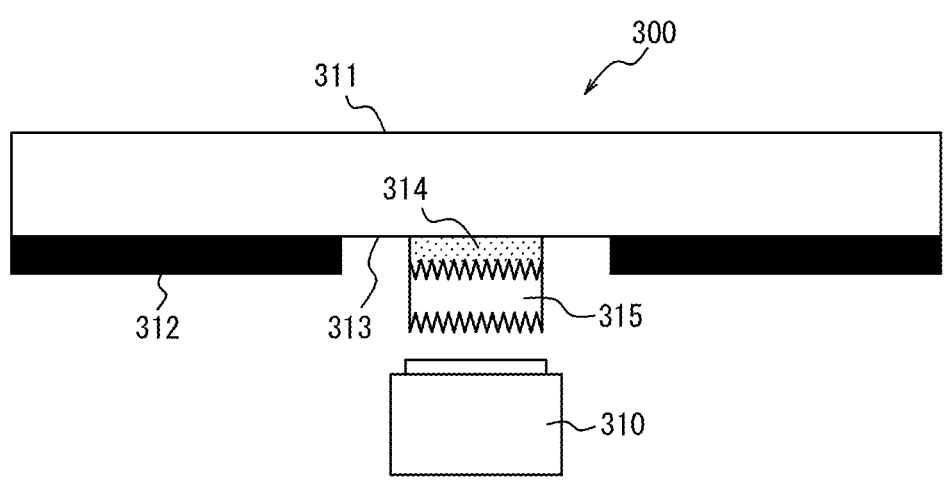
FIG. 6 is a schematic overview illustrating a region in proximity to a camera module of a camera module-equipped device according to one embodiment of the present disclosure.

FIG. 6 is a schematic overview illustrating a region in proximity to a camera module of the camera module-equipped device of the present embodiment. As illustrated in FIG. 6, the camera module-equipped device 300 of the present embodiment includes a camera module 310 and a display panel 311. A light shielding region 312 and a transparent region (non-light shielding region) 313 are formed at one surface of the display panel 311. In the transparent region 313 of the display panel 311, an adhesive layer 314 is stacked and, in addition thereto, a thin film structural body 315 is stacked on the adhesive layer 314.

The display panel 311 is preferably transparent in order that it can be used as a liquid-crystal display, a touch panel, or the like. For example, the display panel 311 may be formed of glass, glass that is surface coated with any organic material, polymethyl methacrylate (PMMA), or the like. The thin film structural body 315 is as previously described for the thin film structural body 110 included in the presently disclosed laminate 100 set forth above.

The adhesive layer 314 and the thin film structural body 315 can be formed on the display panel 311, serving as a base plate, by the presently disclosed method of forming an optical body on a base plate set forth above, and using the presently disclosed laminate 100 set forth above. In such a situation, the adhesive layer 314 and the thin film structural body 315 respectively correspond to the cured adhesive 171' and the thin film structural body 110 described for the formation method of the present embodiment.

The camera module 310 is arranged such that the camera module 310 and the thin film structural body 315 face each other as illustrated in FIG. 6.

No specific limitations are placed on detailed conditions of the device of the present embodiment, such as the specific configuration of the camera module 310, the distance between the camera module 310 and the thin film structural body 315, and so forth.

Examples

The following provides a more specific description of the present disclosure through examples and comparative examples. However, the present disclosure is not limited to the following examples.

Note that testing of detachment upon punching and testing of detachment after vibration were performed by the following procedures for laminates produced in the examples and comparative examples. In addition, half cut processing was evaluated based on the results of testing of detachment upon punching and testing of detachment after vibration.

(Testing of Detachment Upon Punching)

Figure 7:
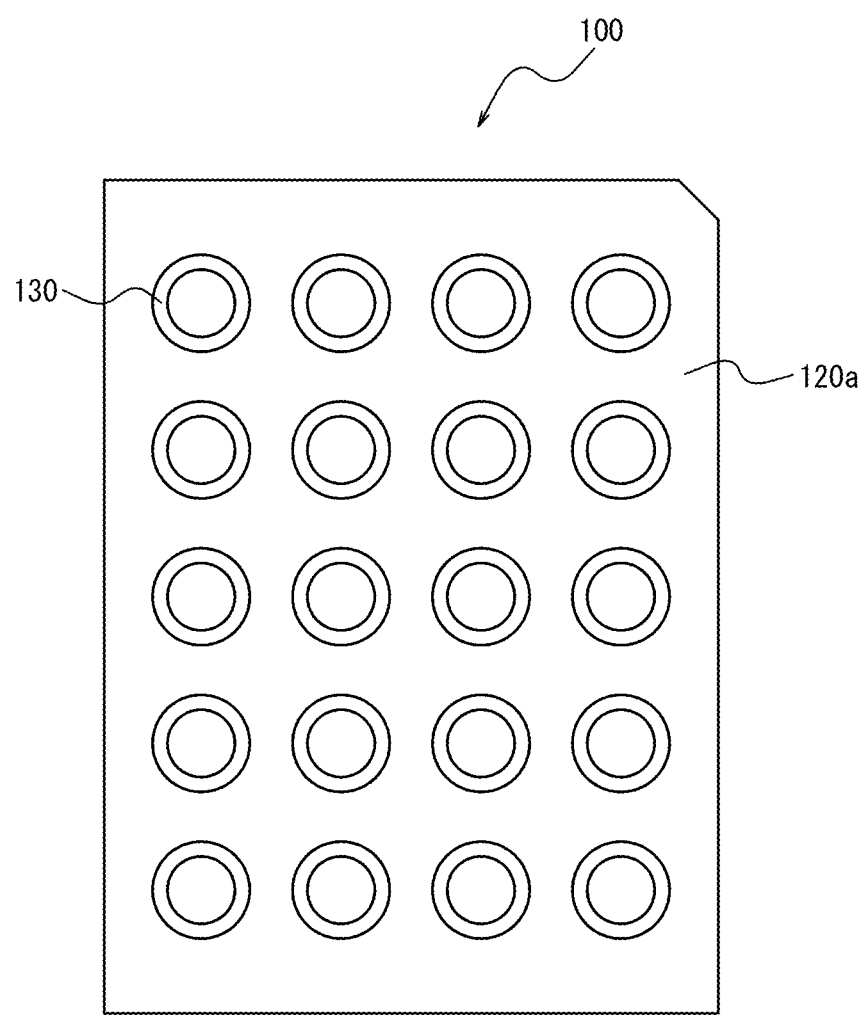
FIG. 7 is a top view illustrating one example of a laminate according to one embodiment of the present disclosure when a punching test is performed using the laminate.

Half cut sections 130 were formed at 20 locations in 5 rows by 4 columns in a laminate 100 as illustrated in FIG. 7. When each of these half cut sections 130 was formed, it was confirmed whether or not a single-side peeled laminate inside of the half cut section 130 became detached.

In testing of detachment upon punching, the outer dimensions of the laminate 100 were set as 50 mm in length by 40 mm in width. Moreover, the interval between centers of adjacent half cut sections 130 was set as 9 mm.

Conditions of a pressing machine, air cylinder 132, and blade 131 in formation of the half cut sections 130 were set as indicated below.

Pressing machine pressure: 35 kN
Air cylinder pressure (per one cylinder inside circle): 19.7 N
Blade: Thompson blade, single-edged blade specification
Pressing machine model no.: MKP-150H produced by Mikado Technos Co., Ltd.

(Testing of Detachment after Vibration)

Testing of detachment after vibration was performed for laminates 100 for which detachment of a single-side peeled laminate inside of a half cut section 130 did not occur in testing of detachment upon punching. In the testing of detachment after vibration, the laminate 100 was subjected to vibration anticipated to occur during transportation thereof, and it was confirmed whether or not a single-side peeled laminate inside of the half cut section 130 became detached.

The testing of detachment after vibration was performed by subjecting a laminate 100 packaged in corrugated cardboard or the like to vibration under the following conditions.

Power spectral density: 5 Hz to 50 Hz, 1.44 [s2/m3]
Overall effective value: 0.83 G
Vibration time: 20 minutes/axis (Evaluation of Half Cut Processing)

Half cut processing was evaluated by the following standard based on the results of testing of detachment upon punching and testing of detachment after vibration.

A: No detachment in both testing of detachment upon punching and testing of detachment after vibration
B: No detachment in testing of detachment upon punching but detachment in testing of detachment after vibration
C: Detachment in testing of detachment upon punching As indicated above, a laminate 100 for which detachment did not occur in testing of detachment upon punching but did occur in testing of detachment after vibration was given a B evaluation rather than a C evaluation because such a laminate 100 can be transported without detachment by transporting the laminate 100 under transportation conditions with little vibration.

(Material of Retention Film)

The following material was used as the base substrate of a retention film in a laminate for which testing of detachment upon punching and testing of detachment after vibration were performed. Note that the following material has four thicknesses (50 μm, 75 μm, 100 μm, and 125 μm), and thus a film of one or other of these thicknesses was used.

Base substrate: COSMOSHINE A4300 PET film produced by Toyobo Co., Ltd.

Moreover, one or other of the three types of resins shown below was used as a fine irregularity layer of the retention film (i.e., a UV-curable resin contained in the retention film). Note that the following resins 1 to 3 are resins that differ in terms of storage modulus at 25° C. Resin 1 has a storage modulus at 25° C. of 4.2 GPa, resin 2 has a storage modulus at 25° C. of 1.1 GPa, and resin 3 has a storage modulus at 25° C. of 510 MPa.

Resin 1 (storage modulus at 25° C.: 4.2 GPa)
UVX6366 produced by Toagosei Co., Ltd.: 59%
M240 produced by Toagosei Co., Ltd.: 39%
Irgacure 184 produced by BASF Japan: 2%

Resin 2 (storage modulus at 25° C.: 1.1 GPa)
  UVX6366 produced by Toagosei Co., Ltd.: 59%
  UN-6200 produced by Negami Chemical Industrial Co., Ltd.: 34%
  Viscoat #150 (THFA) produced by Osaka Organic Chemical Industry Ltd.: 5%
  Irgacure 184 produced by BASF Japan: 2%
Resin 3 (storage modulus at 25° C.: 510 MPa)
  UVX6366 produced by Toagosei Co., Ltd.: 49%
  Produced by Kyoeisha Chemical Co., Ltd.: 49%
  Irgacure 184 produced by BASF Japan: 2%

<Dependence on Thickness of Base Substrate of First Retention Film>

Testing of detachment upon punching and testing of detachment after vibration were performed with the thickness of a base substrate 121 of a first retention film 120a set as the four values indicated below.
  Example 1: 50 μm
  Example 2: 75 μm
  Example 3: 100 μm
  Comparative Example 1: 125 μm In this testing, the thickness of a base substrate 121 of a second retention film 120b, the storage modulus of a fine irregularity layer 122 of the second retention film 120b, and the storage modulus of a fine irregularity layer 122 of the first retention film 120a were set as follows as conditions that were common for each example.
  Thickness of base substrate of second retention film: 125 μm
  Storage modulus of fine irregularity layer 122 of second retention film: 1.1 GPa (resin 2 used)
  Storage modulus of fine irregularity layer 122 of first retention film: 4.2 GPa (resin 1 used)

Results for the dependence on thickness of the base substrate of the first retention film performed for Examples 1 to 3 and Comparative Example 1, described above, are shown below in Table 1.

TABLE 1

|  | Example 1 | Example 2 | Example 3 | Comparative Example 1 |
|---|---|---|---|---|
| Thickness of base substrate of second retention film | 125 μm | 125 μm | 125 μm | 125 μm |
| Thickness of base substrate of first retention film | 50 μm | 75 μm | 100 μm | 125 μm |
| Storage modulus of second retention film | 1.1 GPa (resin 2) | 1.1 GPa (resin 2) | 1.1 GPa (resin 2) | 1.1 GPa (resin 2) |
| Storage modulus of first retention film | 4.2 GPa (resin 1) | 4.2 GPa (resin 1) | 4.2 GPa (resin 1) | 4.2 GPa (resin 1) |
| Detachment upon punching | OK | OK | OK | OK |
| Detachment after vibration | OK | OK | OK | Poor |
| Evaluation of half cut processing | A | A | A | B |

In "Detachment upon punching" or "Detachment after vibration" of Table 1, "OK" indicates that detachment did not occur, whereas "Poor" indicates that detachment did occur.

As shown in Table 1, detachment did not occur in testing of detachment upon punching or in testing of detachment after vibration in Examples 1 to 3. Accordingly, a good result (A evaluation) was given in evaluation of half cut processing. This is thought to be due to the base substrate 121 of the first retention film 120a having sufficient flexibility as a result of being thin, and due to deformation of the first retention film 120a during punching being small. It is also thought that as a result of deformation of the first retention film 120a being small, close adherence through an anchor effect between the thin film structural body 110 and the second retention film 120b was maintained, and, consequently, detachment did not occur even in testing of detachment after vibration.

On the other hand, although detachment did not occur in testing of detachment upon punching in Comparative Example 1, detachment did occur in testing of detachment after vibration. Accordingly, a B evaluation was given in evaluation of half cut processing. This is thought to be due to the base substrate 121 of the first retention film 120a having insufficient flexibility as a result of being thick, and due to deformation of the first retention film 120a during punching being large. It is also thought that upon punching, the thin film structural body 110 was peeled from the second retention film 120b to a degree that did not cause detachment, and the anchor effect between the thin film structural body 110 and the second retention film 120b was lost due to deformation of the first retention film 120a being large, and thus detachment did occur in testing of detachment after vibration.

<Dependence on Storage Modulus of Second Retention Film>

Testing of detachment upon punching and testing of detachment after vibration were performed with the storage modulus of a fine irregularity layer 122 of a second retention film 120b set as the following three values.
  Example 4: 510 MPa (resin 3 used)
  Example 1: 1.1 GPa (resin 2 used)
  Comparative Example 2: 4.2 GPa (resin 1 used)

In this testing, the thickness of a base substrate 121 of the second retention film 120b, the thickness of a base substrate 121 of a first retention film 120a, and the storage modulus of a fine irregularity layer 122 of the first retention film 120a were set as follows as conditions that were common for each example.
  Thickness of base substrate of second retention film: 125 μm
  Thickness of base substrate of first retention film: 50 μm
  Storage modulus of fine irregularity layer of first retention film: 4.2 GPa (resin 1 used)

Results for the dependence on the storage modulus of the fine irregularity layer of the second retention film performed for Example 4, Example 1, and Comparative Example 2, described above, are shown below in Table 2.

TABLE 2

|  | Example 4 | Example 1 | Comparative Example 2 |
|---|---|---|---|
| Thickness of base substrate of second retention film | 125 μm | 125 μm | 125 μm |
| Thickness of base substrate of first retention film | 50 μm | 50 μm | 50 μm |
| Storage modulus of second retention film | 510 MPa (resin 3) | 1.1 GPa (resin 2) | 4.2 GPa (resin 1) |
| Storage modulus of first retention film | 4.2 GPa (resin 1) | 4.2 GPa (resin 1) | 4.2 GPa (resin 1) |
| Detachment upon punching | OK | OK | Poor |
| Detachment after vibration | OK | OK | N/A |
| Evaluation of half cut processing | A | A | C |

Figure 8A:
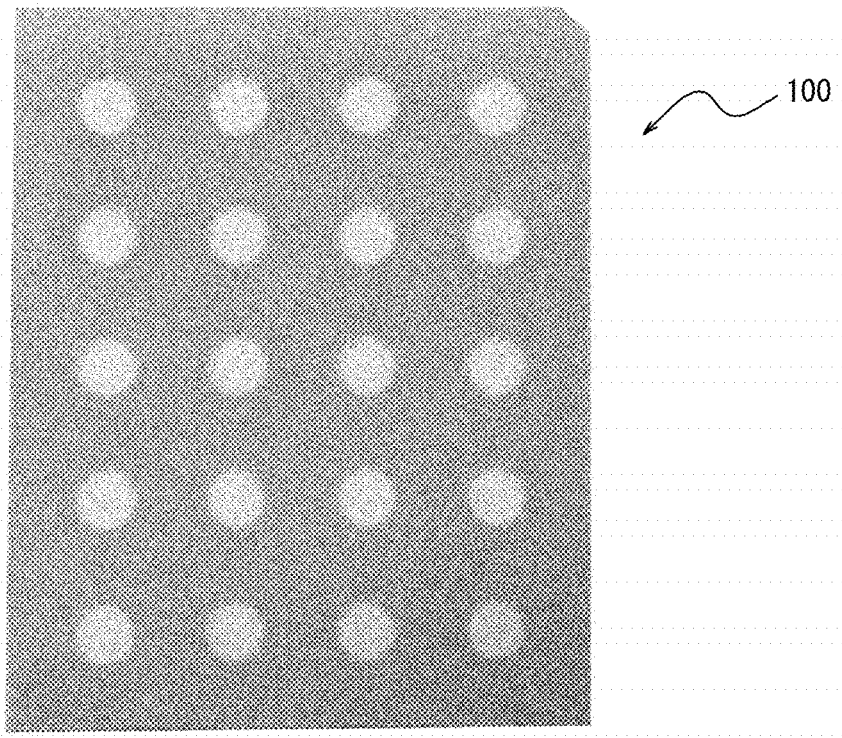
FIG. 8A illustrates the appearance of a laminate according to Comparative Example 2 after testing of detachment upon punching.
Figure 8B:
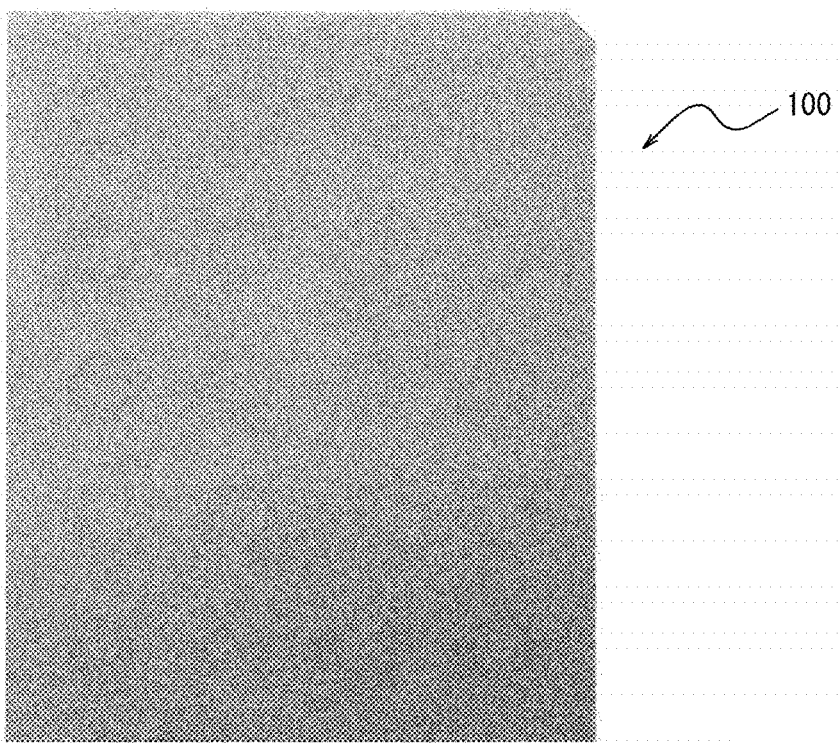
FIG. 8B illustrates the appearance of a laminate according to Example 4 after testing of detachment upon punching.

FIG. 8A illustrates the appearance of a laminate 100 according to Comparative Example 2 after testing of detachment upon punching. In the laminate 100 according to Comparative Example 2, detachment occurred for all of the half cut sections 130 at the 20 locations in 5 rows by 4 columns as illustrated in FIG. 8A. FIG. 8B illustrates the appearance of a laminate 100 according to Example 4 after testing of detachment upon punching. In the laminate 100 according to Example 4, detachment did not occur for any of the half cut sections 130 at the 20 locations in 5 rows by 4 columns as illustrated in FIG. 8B.

In "Detachment upon punching" or "Detachment after vibration" of Table 2, "OK" indicates that detachment did not occur, whereas "Poor" indicates that detachment did occur. Moreover, "N/A" for "Detachment after vibration" indicates that detachment occurred in testing of detachment upon punching, and thus testing of detachment after vibration was not subsequently performed.

As shown in Table 2, detachment did not occur in testing of detachment upon punching or testing of detachment after vibration in Example 4 and Example 1. Accordingly, a good result (A evaluation) was given in evaluation of half cut processing. On the other hand, detachment occurred in testing of detachment upon punching in Comparative Example 2. Accordingly, a C evaluation was given in evaluation of half cut processing. Based on the results shown in Table 2, it is thought that a good evaluation of half cut processing is achieved when the storage modulus of the fine irregularity layer 122 of the second retention film 120b is 1.1 GPa or less.

Through evaluation of "Dependence on thickness of base substrate of first retention film" and "Dependence on storage modulus of second retention film" described above, it was possible to discover suitable conditions for forming the half cut section 130 in the laminate 100. Specifically, the thickness of the base substrate 121 of the first retention film 120a is preferably 100 μm or less. Moreover, the storage modulus at 25° C. of the fine irregularity layer 122 of the second retention film 120b is preferably 1.1 GPa or less.

INDUSTRIAL APPLICABILITY

According to the present disclosure, it is possible to provide a laminate that enables simple peeling of a thin film structural body having a fine irregularity structure at a surface thereof when the thin film structural body is to be bonded to an object serving as an adherend, that has improved environment testing durability, and in which waviness is inhibited. Moreover, according to the present disclosure, it is possible to provide a method of producing this laminate. Furthermore, according to the present disclosure, it is possible to provide a method of forming an optical body having excellent anti-reflection performance on a base plate using this laminate. Also, according to the present disclosure, it is possible to provide a camera module-equipped device that can acquire a captured image in which color irregularities, ghosts, and the like are inhibited.

REFERENCE SIGNS LIST 100 laminate
100' single-side peeled laminate
110 thin film structural body
110-1 first fine irregularity structure
110-2 second fine irregularity structure
120a first retention film
120a-1 third fine irregularity structure
120b second retention film
120b-1 fourth fine irregularity structure
121 base substrate
122 fine irregularity layer
130 half cut section
131 blade
132 air cylinder
151 UV-curable resin
160 roll laminator
170 base plate
171 adhesive
171' cured adhesive
200 optical body
300 camera module-equipped device
310 camera module
311 display panel
312 light shielding region
313 transparent region
314 adhesive layer
315 thin film structural body

The invention claimed is:

1. A laminate comprising a film structural body and retention films, wherein
a first retention film is stacked on one face of the film structural body and a second retention film is stacked on another face of the film structural body,
the film structural body has a first irregularity structure at a face that is in contact with the first retention film and has a second irregularity structure at a face that is in contact with the second retention film,
the first retention film has a third irregularity structure at a face that is in contact with the film structural body,
the second retention film has a fourth irregularity structure at a face that is in contact with the film structural body,
the laminate includes a half cut section in a thickness direction,
the second retention film contains a UV-curable resin, and the UV-curable resin has a storage modulus at 25° C. of 1.1 GPa or less,
the first retention film and the second retention film are peelable from the film structural body,
P1>P2 is satisfied when peeling force at an interface of the first retention film and the film structural body in a 90° peeling test in accordance with JIS Z0237:2009 is taken to be P1 (N/25 mm) and peeling force at an interface of the second retention film and the film structural body in a 90° peeling test in accordance with JIS Z0237:2009 is taken to be P2 (N/25 mm), and
P1−P2 is 0.03 (N/25 mm) or more and is 0.3 (N/25 mm) or less.

2. The laminate according to claim 1, wherein a base substrate of the first retention film has a thickness of 100 μm or less.

3. The laminate according to claim 1, wherein the half cut section has a circular shape or a polygonal shape in a top view of the laminate.

4. The laminate according to claim 1, wherein the film structural body has a thickness of 5 μm or less.

5. The laminate according to claim 1, wherein the first retention film contains a UV-curable resin.

6. The laminate according to claim 1, wherein the third irregularity structure is an inverted structure of the first irregularity structure and the fourth irregularity structure is an inverted structure of the second irregularity structure.

7. The laminate according to claim 1, wherein the first irregularity structure, the second irregularity structure, the third irregularity structure, and the fourth irregularity structure are each formed of an irregularity pattern having a pitch equal to or less than a wavelength of visible light.

8. A method of producing a laminate comprising a step of, in formation of the half cut section in the laminate according to claim 1, forming the half cut section with the laminate in a pressed state.

9. A method of forming an optical body on a base plate comprising peeling the first retention film and the second retention film from the laminate according to claim 1 and stacking the film structural body on a base plate via an adhesive.

10. The method of forming an optical body on a base plate according to claim 9 comprising:
    a first peeling step of peeling a single-side peeled laminate formed of the film structural body and the first retention film from the second retention film, inside of the half cut section, to obtain the single-side peeled laminate;
    an application step of applying the adhesive onto the base plate;
    a pressing step of pressing the single-side peeled laminate against the adhesive that has been applied such that a face where the second retention film has been peeled off faces toward the base plate;
    a curing step of irradiating the adhesive that has been pressed with UV light to cure the adhesive; and
    a second peeling step of releasing pressing of the single-side peeled laminate and peeling the film structural body from the single-side peeled laminate to form an optical body formed of the adhesive that has been cured and the film structural body on the base plate.

11. A camera module-equipped device comprising a camera module and a display panel, wherein
    the display panel includes an adhesive layer stacked on at least part of a surface thereof and a film structural body stacked on the adhesive layer,
    the camera module is arranged such that the camera module and the film structural body face each other, and
    the film structural body is a film structural body obtained by peeling the first retention film and the second retention film from the laminate according to claim 1.

* * * * *